C. R. SANBORN.
FLOWER BOX.
APPLICATION FILED FEB. 24, 1919.

1,351,490. Patented Aug. 31, 1920.

Inventor:
Charlotte R. Sanborn
by Roberts Roberts & Cashman
attys.

UNITED STATES PATENT OFFICE.

CHARLOTTE REDDEN SANBORN, OF SOMERVILLE, MASSACHUSETTS.

FLOWER-BOX.

1,351,490.  Specification of Letters Patent.  Patented Aug. 31, 1920.

Application filed February 24, 1919. Serial No. 278,642.

*To all whom it may concern:*

Be it known that I, CHARLOTTE R. SANBORN, a citizen of the United States, and resident of Somerville, in the county of Middlesex and State of Massachusetts, have invented new and useful Improvements in Flower-Boxes, of which the following is a specification.

This invention relates to a device adapted to support flowers in various locations and positions and more particularly to a flower box adapted to be supported in windows of different widths.

The objects of the invention are to provide a device for supporting flowers which can be attached either to a plane wall or between two opposing walls such as the opposite sides of a window casing, which can be mounted to extend different distances from a wall when mounted on a plane wall, which when mounted between the opposite sides of a window casing can be extended either inside or outside the window without changing the connections thereof, and which possesses other advantageous features which will appear hereinafter.

I have illustrated the preferred embodiment of my invention in the accompanying drawings in which—

Figure 1:
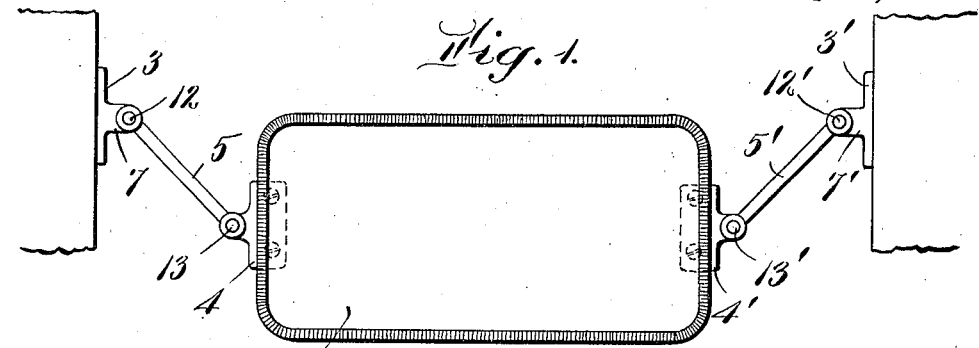
Figure 1 is a top plan view of the device supported between the opposite sides of a window casing.

The particular embodiment of my invention chosen for the purpose of illustration comprises a flower box B which may be constructed in any suitable form but which comprises, as illustrated in the drawings, a horizontal bottom 1 of wood and continuous side walls 2 of woven reed. The device also comprises brackets which consist of wall members 3 and 3', L-shaped members 4 and 4', and intermediate portions 5 and 5'. The wall portions comprise a flat outer portion adapted to be secured to a window casing, wall or the like, by means of screws 6, and inwardly extended lugs 7 and 7' which have vertical openings therein. The L-shaped members 4 and 4' comprise horizontal portions adapted to extend under the opposite ends of the flower box and vertical portions adapted to extend upwardly along the opposite ends of the box. The upwardly extending portions are provided with lateral lugs 8 and 8' having openings extending vertically therethrough. The intermediate portions 5 and 5' of the brackets comprise arms which preferably have a considerable vertical width but which are relatively thin horizontally as shown in Fig. 1.

The arms have portions 9 and 9' overhanging the lugs 7 and 7' on the wall member 3 and 3' and the arms have portions 10 and 10' extending under the lugs 8 and 8' on the L-shaped members 4 and 4'. The arms are also preferably provided with portions 11 and 11' extending over lugs 8 and 8' on the L-shaped members 4 and 4'. Pins 12 and 12' extend from the portions 9 and 9' of the arms 5 and 5' into the vertical openings in the lugs 7 and 7' of the wall members 3 and 3'. These pins may be formed integrally with the portions 9 and 9' of the arms but they are preferably made as separate parts and are extended through openings in the portions 9 and 9' of the arms into the openings in the lugs 7 and 7'. In order to prevent the pins 12 and 12', from dropping out of the openings in the lugs 7 and 7' they may either terminate somewhat above the lower face of the lugs or the pins may be provided with heads, and in the drawings I have shown both of these features. The inner ends of the arms 5 and 5' are attached to the lugs 8 and 8' by means of the pins 13 and 13' as illustrated.

Figure 2:
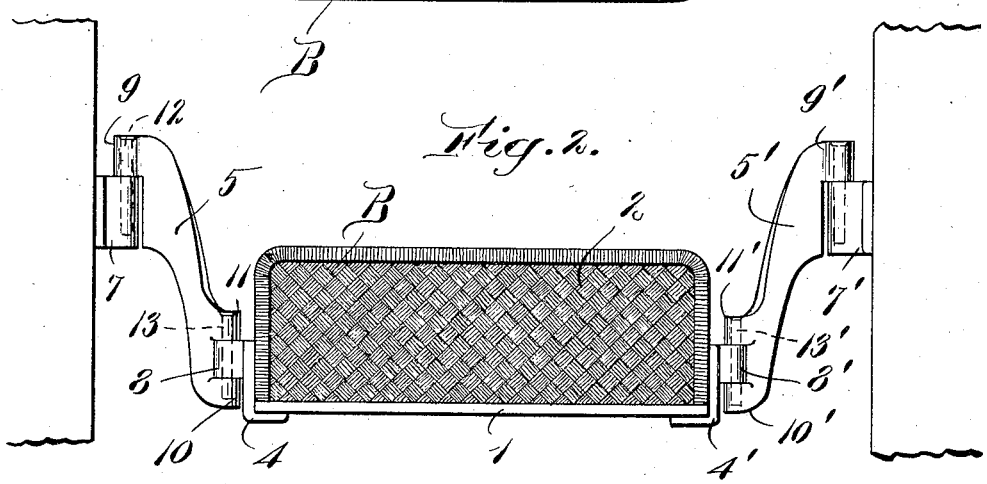
Fig. 2 is a side elevation of the device supported as in Fig. 1.
Figure 3:
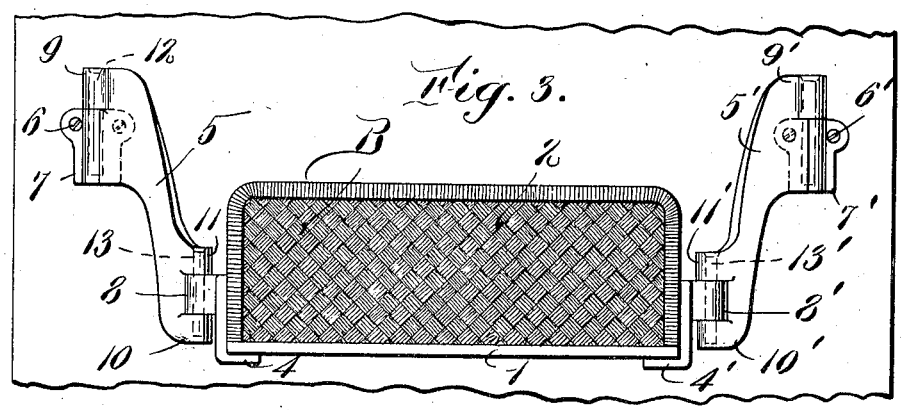
Fig. 3 is a side elevation of the device supported on a plane wall.
Figure 4:
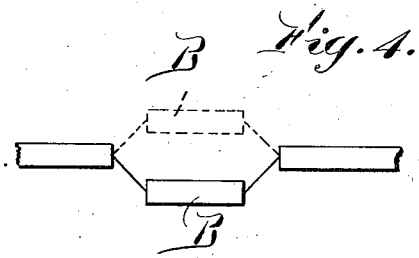
Fig. 4 is a top plan view similar to Fig. 1, on a reduced scale, showing how the flower box may be extended either inside or outside a window.

By virtue of the unique arrangement of the bracket portions of the device the device is peculiarly adapted to be supported in any one of a number of different positions and locations. For example the device may be supported between the opposite sides of a window casing as illustrated in Figs. 1 and 2, and in this connection it is to be noted that the device is adapted to windows of different widths. Moreover the device may be extended either inside or outside the window as shown in Fig. 4. In order to change the device from the full-line position inside the window to the dotted line position outside the window (Fig. 4) it is merely necessary to lift the box sufficiently to detach the outer ends of the arms 5 and 5' from the wall members 3 and 3', then remove the device outside the window, and finally lower the device until the pins 12 and 12' seat in the sockets in the wall members. By virtue of this arrangement the device may normally be extended inside the window or may readily be extended outside the window to give the flowers rain or sunshine.

The supporting portions of the device are also adapted to support the flower box along a flat wall, as for example along the outside wall of a house beneath a window. The supporting elements of the combination are also adapted to support the box at different distances from the wall, it being necessary merely to vary the distance between the wall members 3 and 3' in order to vary the distance of the box from the wall.

What I claim is:

A device adapted to support flowers in various locations and positions comprising a flower box, L-shaped members adapted to hook under the opposite ends of the box, wall members adapted to be secured to a wall, and arms extending between said L-shaped members and said wall members, said L-shaped members and said wall members having lateral lugs with vertical openings therein, said arms extending under the lugs in said L-shaped members and over the lugs on said wall member, and pivot pins extending from the ends of said arms into said openings in the L-shaped and wall members respectively.

Signed by me at Boston, Massachusetts, this 20th day of February 1919.

CHARLOTTE REDDEN SANBORN.